US008619390B2

(12) United States Patent
Cazacu et al.

(10) Patent No.: US 8,619,390 B2
(45) Date of Patent: Dec. 31, 2013

(54) TRANSDUCING HEAD WRITER HAVING WRITE POLE BRIDGE FEATURE, AND DEVICES THEREOF

(75) Inventors: Alexandru Cazacu, Londonderry (GB); Mark Anthony Gubbins, Letterkenny (IE); Marcus B. Mooney, Burnfoot (IE)

(73) Assignee: Seagate Technology LLC, Cupertino, CA (US)

( * ) Notice: Subject to any disclaimer, the term of this patent is extended or adjusted under 35 U.S.C. 154(b) by 441 days.

(21) Appl. No.: 12/807,680

(22) Filed: Sep. 10, 2010

(65) Prior Publication Data

US 2012/0063031 A1 Mar. 15, 2012

(51) Int. Cl.
*G11B 5/147* (2006.01)
*G11B 5/187* (2006.01)

(52) U.S. Cl.
USPC .............. 360/125.07; 360/125.06; 360/125.1; 360/125.11; 360/125.14; 360/125.15

(58) Field of Classification Search
USPC ............ 360/125.06, 125.07, 125.08, 125.09, 360/125.1, 125.11, 125.12, 125.13, 125.14, 360/125.15
See application file for complete search history.

(56) References Cited

U.S. PATENT DOCUMENTS

| 5,793,578 | A | 8/1998 | Heim et al. | |
|---|---|---|---|---|
| 5,935,644 | A | 8/1999 | Heim et al. | |
| 6,504,675 | B1 | 1/2003 | Shukh et al. | |
| 6,687,083 | B2 | 2/2004 | Hsiao et al. | |
| 6,809,900 | B2 | 10/2004 | Covington | |
| 6,816,339 | B1 | 11/2004 | Litvinov et al. | |
| 6,834,026 | B2 | 12/2004 | Fullerton et al. | |
| 6,842,313 | B1 | 1/2005 | Mallary | |
| 6,881,503 | B2 | 4/2005 | Lu et al. | |
| 6,952,325 | B2 * | 10/2005 | Sato et al. | 360/125.08 |
| 7,292,409 | B1 | 11/2007 | Stoev et al. | |
| 7,369,360 | B2 | 5/2008 | Vas'ko et al. | |
| 7,377,024 | B2 | 5/2008 | Chen | |
| 7,430,095 | B2 | 9/2008 | Benakli et al. | |
| 7,796,361 | B2 * | 9/2010 | Sasaki et al. | 360/125.13 |
| 7,870,660 | B2 * | 1/2011 | Sasaki et al. | 29/603.16 |
| 8,125,732 | B2 * | 2/2012 | Bai et al. | 360/125.09 |
| 8,270,109 | B2 * | 9/2012 | Ohtsu | 360/125.03 |
| 2003/0133231 | A1 | 7/2003 | Nikitin et al. | |
| 2005/0047012 | A1 | 3/2005 | Lille et al. | |
| 2005/0128637 | A1 | 6/2005 | Johnston et al. | |
| 2006/0119981 | A1 * | 6/2006 | Li et al. | 360/125 |
| 2006/0256471 | A1 | 11/2006 | Plumer et al. | |
| 2007/0103813 | A1 | 5/2007 | Khera et al. | |
| 2007/0211382 | A1 * | 9/2007 | Mochizuki et al. | 360/126 |
| 2008/0204930 | A1 | 8/2008 | Luo et al. | |
| 2009/0201611 | A1 | 8/2009 | Guan et al. | |
| 2009/0251821 | A1 | 10/2009 | Song et al. | |
| 2009/0284874 | A1 | 11/2009 | Yin et al. | |

* cited by examiner

*Primary Examiner* — Jefferson Evans
(74) *Attorney, Agent, or Firm* — Alan G. Rego; Westman, Champlin & Koehler, P.A.

(57) ABSTRACT

A transducing head writer comprising a write pole having write pole tip, a yoke disposed on the write pole at a location that is recessed from the write pole tip, and a bridge feature disposed on the write pole between the yoke and the write pole tip, where the bridge feature has a geometry that is larger at a recessed end adjacent to the yoke compared to a proximate end adjacent to the write pole tip.

20 Claims, 14 Drawing Sheets
(1 of 14 Drawing Sheet(s) Filed in Color)

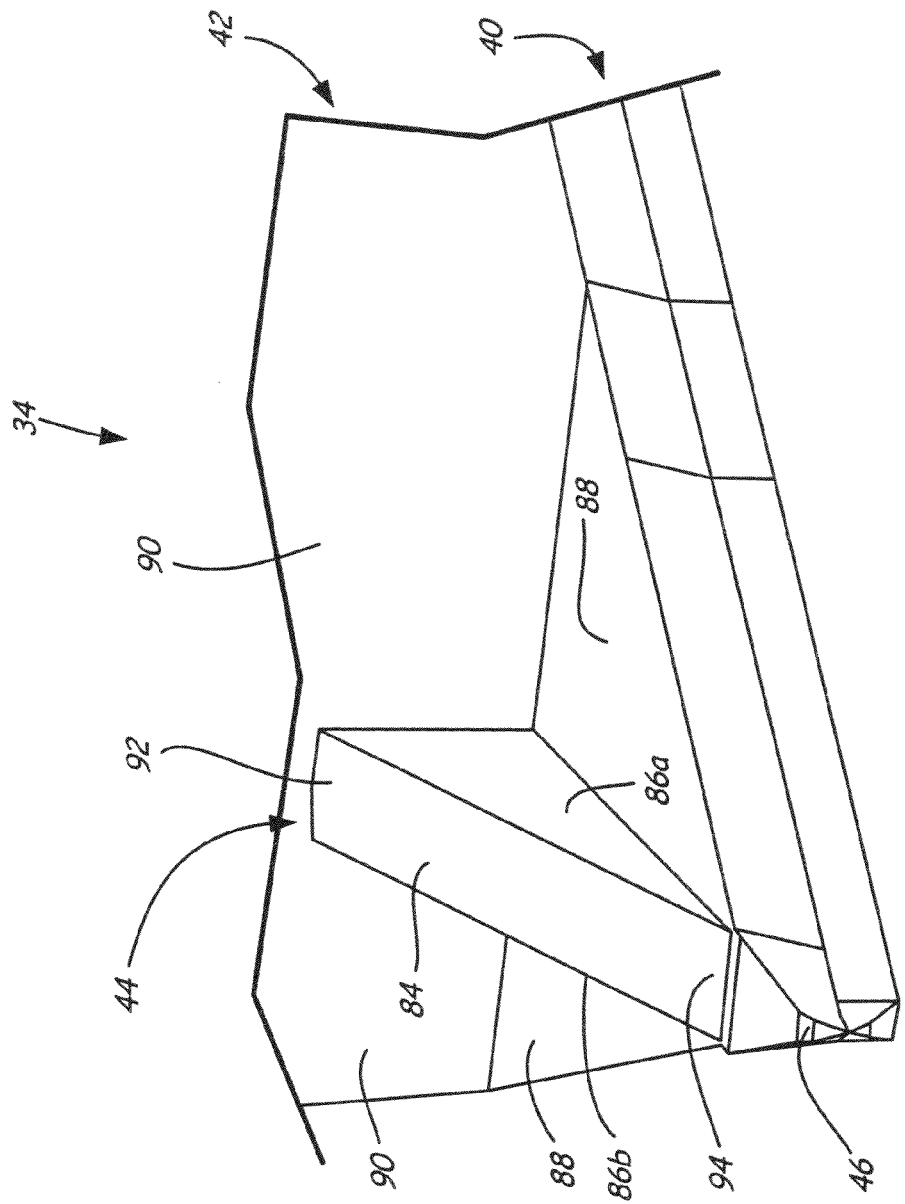
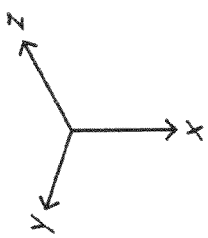
Fig. 3

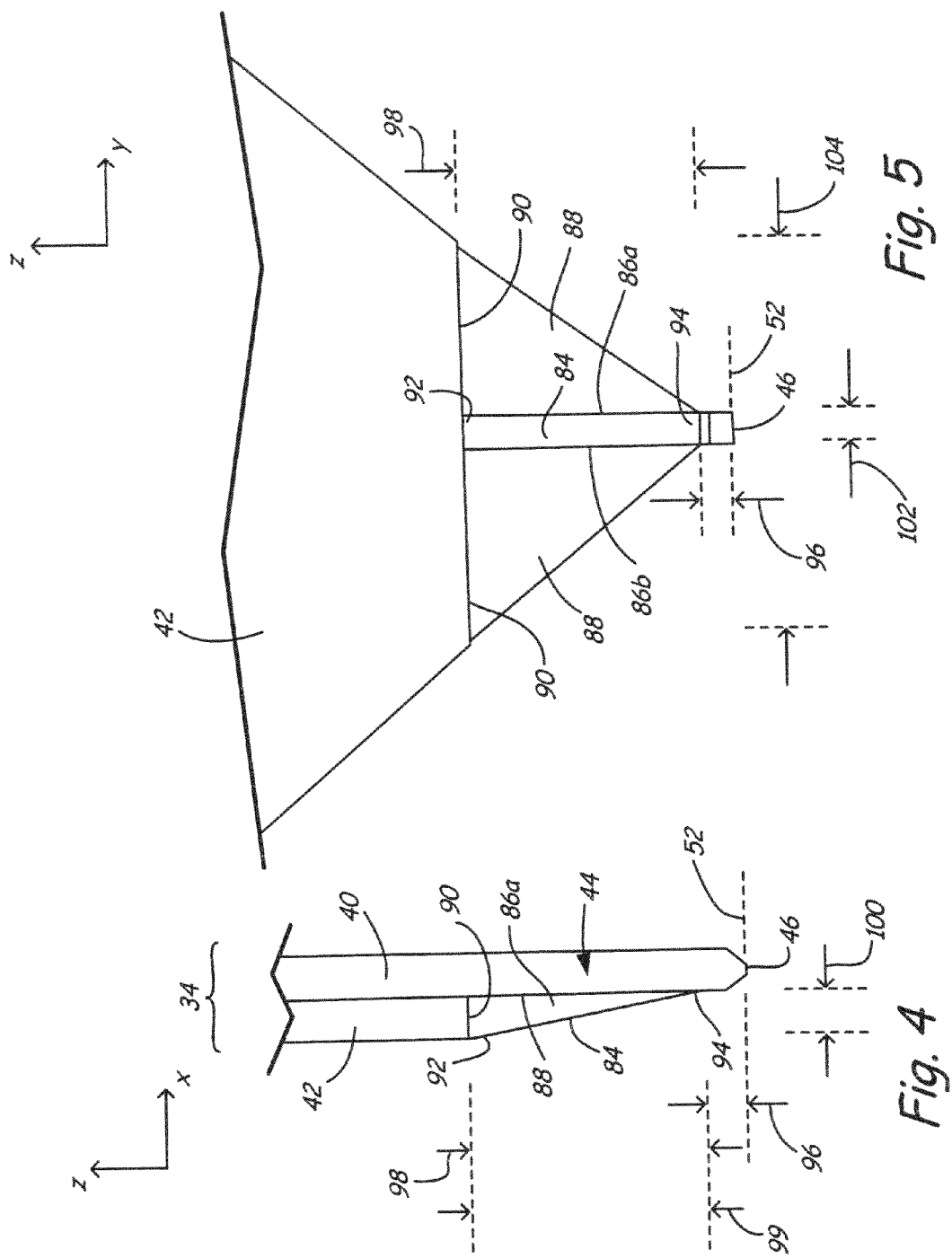

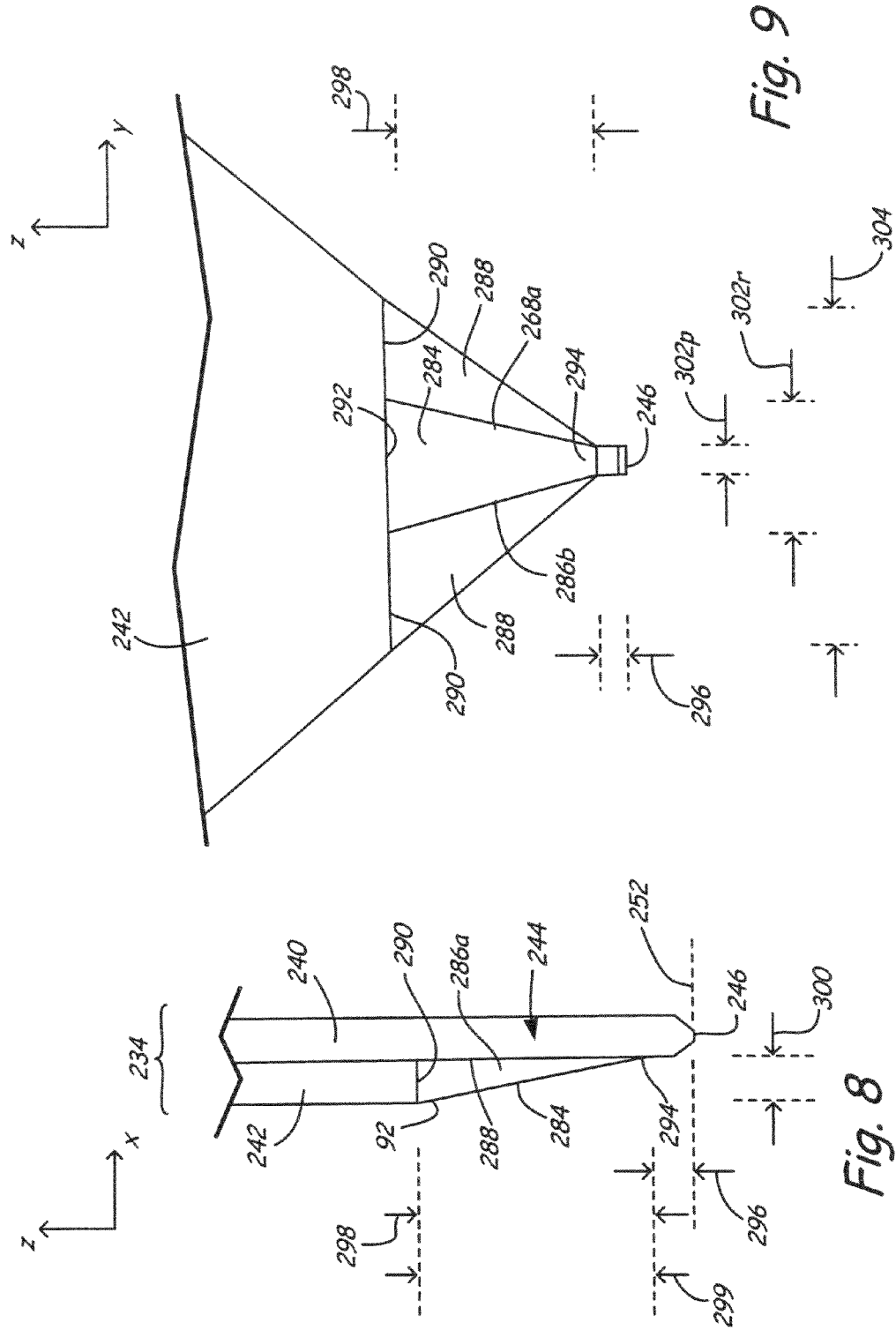

TRANSDUCING HEAD WRITER HAVING WRITE POLE BRIDGE FEATURE, AND DEVICES THEREOF

BACKGROUND

The present disclosure is directed to devices, such as data storage devices. In particular, the present disclosure is directed to transducing head writers for use in devices, such as data storage devices.

Data storage devices, such as disk drives, typically store information on surfaces of storage media, such as magnetic or optical disks. In a typical disk drive, one or more disks are mounted together on a spindle motor. The spindle causes the disk(s) to spin and the data surfaces of the disk(s) to pass under respective bearing sliders. A transducing head carried by a slider is used to read from and write to a data track on a disk. The slider is typically carried by a head arm assembly that includes an actuator arm and a suspension assembly, which can include a separate gimbal structure or can integrally form a gimbal. During operation, as the disk spins, the slider glides above the surface of the disk on a small cushion of air, and the actuator arm pivots to movably position the slider with respect to the disk.

A typical transducing head includes a reader and writer. The writer typically has a yoke disposed on a write pole, where the yoke facilitates switching of magnetic fields and assists in channeling magnetic flux towards a trailing edge of the write pole. This allows magnetic transitions to be written through the write pole to a magnetic recording medium. The yoke is a structural region where magnetization for writing data may be fully reversed in a very short amount of time (e.g., within less than 100 picoseconds). In comparison, it can take more than 250 picoseconds for the magnetization in the write pole to fully reverse. It can take even longer for the write pole to achieve maximum opposite field and to stabilize a front shield of the writer. This reversal of the magnetic field is typically achieved through domain and vortex movement, gradually from the yoke structure to a tip of the write pole.

SUMMARY

A first aspect of the present disclosure is directed to a transducing head writer that includes a write pole having a surface and a write pole tip, and a yoke disposed on the surface of the write pole at a location that is recessed from the write pole tip. The transducing head writer also includes a bridge feature disposed on the surface of the write pole between the yoke and the write pole tip, where the bridge feature has a geometry that is larger at a recessed end adjacent to the yoke compared to a proximate end adjacent to the write pole tip.

Another aspect of the present disclosure is directed to a transducing head writer that includes a write pole having a surface and a write pole tip, a yoke disposed on the surface of the write pole at a location that is recessed along an axis from the write pole tip, and a bridge feature disposed on the surface of the write pole. The bridge feature includes a recessed end that is adjacent to the yoke, and a proximate end that is adjacent to the write pole tip. The bridge feature also has a first cross-sectional area orthogonal to the axis at the recessed end, and a second cross-sectional area orthogonal to the axis at the proximate end, where the first cross-sectional area is greater than the second cross-sectional area.

Another aspect of the present disclosure is directed to a transducing head writer that includes a write pole having a write pole tip, and a yoke disposed on the write pole. The transducing head writer also includes a bridge feature disposed on the write pole, where the bridge feature has a cross-sectional area that decreases from the yoke toward the write pole tip.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 is a perspective view of the pole element of the writer according to an embodiment.

FIG. 4 is an expanded side schematic illustration of the pole element of the writer according to an embodiment.

FIG. 5 is an expanded front schematic illustration of the pole element of the writer according to an embodiment.

FIG. 8 is an expanded side schematic illustration of the pole element of the first alternative writer according to an embodiment.

FIG. 9 is an expanded front schematic illustration of the pole element of the first alternative writer according to an embodiment.

DETAILED DESCRIPTION

An exemplary aspect of the present disclosure is directed to a device, such as a data storage device, that includes a transducing head having a writer. The writer includes a modified yoke disposed on a write pole, where the yoke includes a bridge feature that is disposed between the yoke and a write pole tip of the write pole. In particular, the bridge feature extends along a region between the yoke and the write pole tip, and exhibits dimensions that decrease in cross-sectional area from the yoke to the write pole tip.

The transducing head has a bearing surface that faces a recording medium of the device. The write pole tip of the write pole may be placed along the bearing surface at a position that is at or near the closest point to a recording medium, such as along a trailing edge of the transducing head. As discussed above, in a 1 transducing head, the write pole may take more time for magnetization to fully reverse compared to full reversal in the yoke. To speed up the magnetization reversal in the write pole may involve positioning the yoke closer to the write pole tip. However, this decrease in yoke recession relative to the write pole tip and bearing surface may also have a negative impact on magnetic shields of the writer (e.g., a front shield). Due to its relatively large size, the yoke may generate considerable fields towards the magnetic shields, which may potentially cause multiple anti-phase domains. The formation of such anti-phase domains may correspondingly degrade magnetic field gradients and increase the risk of track erasures in the recording medium.

As discussed below, in an exemplary embodiment, the inclusion of a bridge feature between the yoke and the write pole tip allows the yoke to remain recessed from the write pole tip and the bearing surface, while also increasing the rate of magnetization reversal in the write pole region between the yoke to the write pole tip. This increase in the rate of magnetization reversal accordingly may allow high magnetic gradients and high write fields to be achieved, reduce the risk of shield erasures, and provide good writer magnetic switching. As such, the device may be capable of attaining high bits-per-inch (BPI) densities and high data transfer rates.

Figure 1:
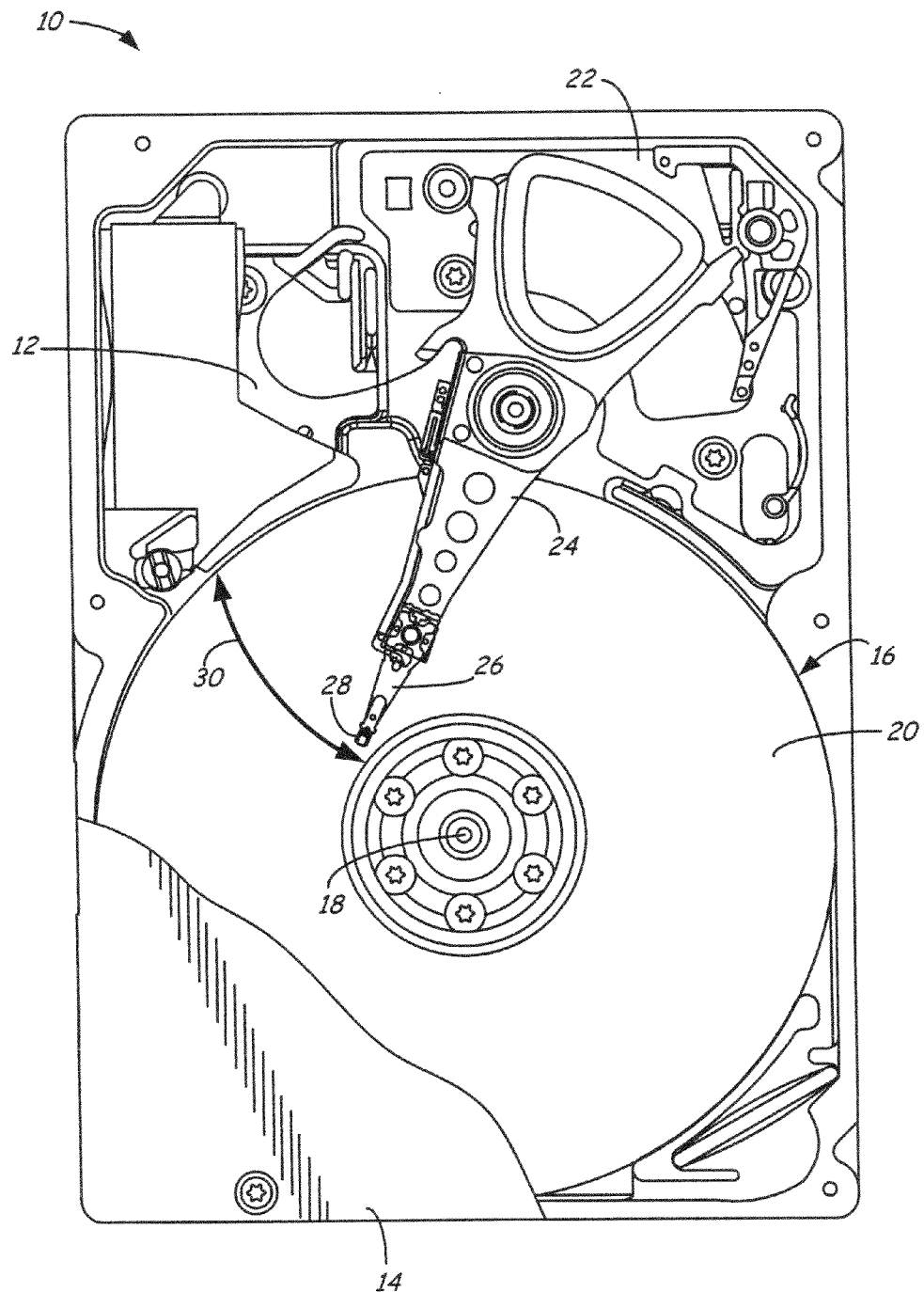
FIG. 1 is a plan view of a disk drive having a transducing head writer according to an embodiment of the present disclosure.

As shown in FIG. 1, disk drive 10 is an exemplary data storage device (e.g., a hard disk drive) for storing and transferring digital data with a host device (not shown). The components of disk drive 10 are retained between base 12 and top cover 14 (shown in partial cut-away), which mate to form a partially or fully sealed housing. Disk drive 10 includes storage disk 16 and spindle motor 18, where spindle motor 18 rotates storage disk 16 in a rotational direction during operation. Storage disk 16 includes recordable surface 20, which is a surface of storage disk 16 having one or more recordable regions.

Disk drive 10 further includes actuation motor 22 (e.g., a voice coil motor), actuator arm 24, suspension assembly 26, and slider 28, where slider 28 carries a transducing head having a perpendicular writer according to a first embodiment of the present disclosure (not shown in FIG. 1). Slider 28 is supported by suspension assembly 26, which in turn is supported by actuator arm 24. Actuation motor 22 is configured to pivot actuator arm 24 about an axis in order to sweep suspension assembly 26 and slider 28 in an arc across recordable surface 20 (represented by arrow 30), where slider 28 floats above recordable surface 20 on a cushion or air, for example. An additional microactuation system (not shown) may also be used to produce precise, small-scale movements of suspension assembly 26 and slider 28. As slider 28 moves across recordable surface 20, the transducing head carried by slider 28 may be positioned relative to selected data tracks located on recordable surface 20. This allows the transducing head to write data to, and read from, the data tracks on recordable surface 20 during operation.

Figure 2:
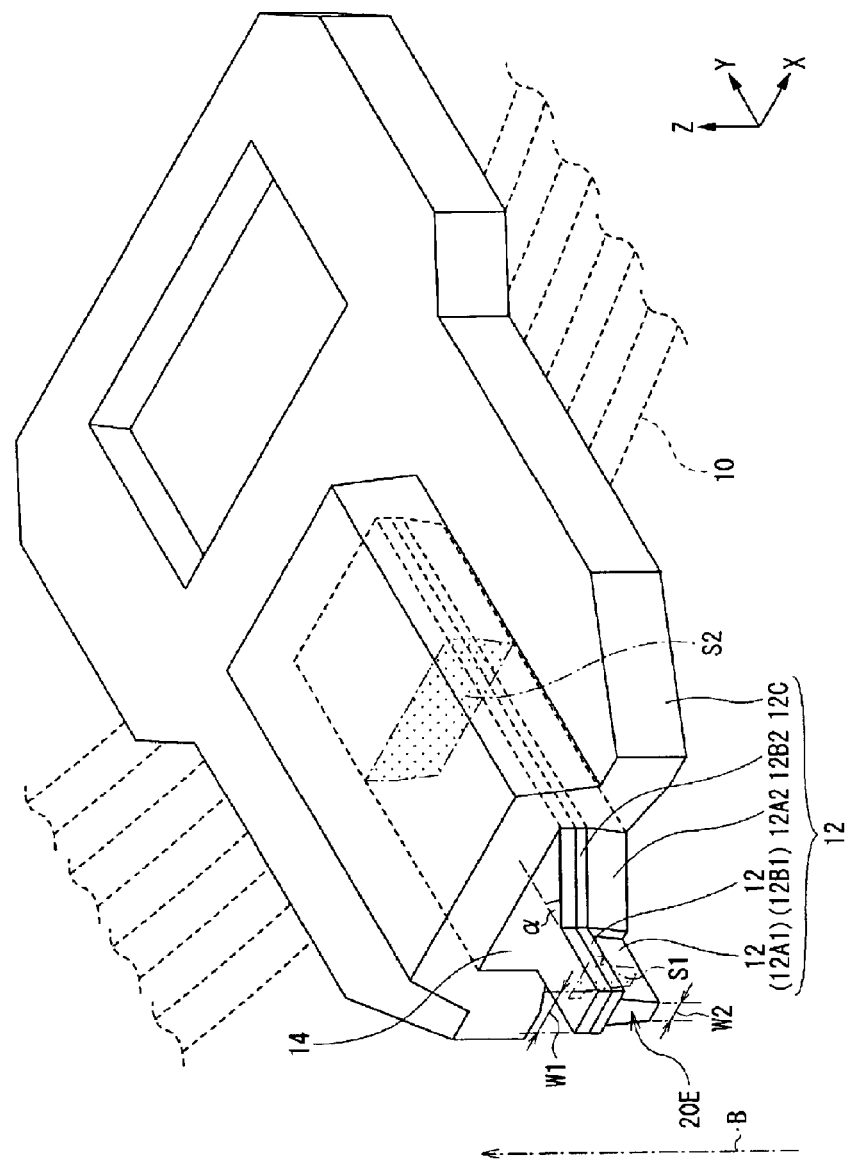
FIG. 2 is a side schematic illustration of the writer and a magnetic disk, taken along a plane normal to a bearing surface, where the perpendicular writer includes a pole element having a bridge feature according to an embodiment.

FIG. 2 illustrates writer 32, which is an example of a suitable writer of the transducing head carried by slider 28 (shown in FIG. 1) for writing data to recordable surface 20. The transducing head may also include a reading element (not shown), which may be located laterally on either side of writer 32.

In the shown exemplary embodiment, writer 32 is a perpendicular writer that includes pole element 34, which is disposed between return poles 36 and 38. In an alternative embodiment, writer 32 may include only a single return pole, such as corresponding to return pole 36. However, the intensity of a magnetic field returning into return poles 36 and 38 is approximately twice as small as the intensity of a magnetic field returning into a single return pole. This is beneficial since a smaller intensity decreases the likelihood of erasure by a given return pole.

Pole element 34 includes write pole 40, yoke 42, and bridge feature 44, where write pole 40 includes write pole tip 46. As shown, return poles 36 and 38 respectively include return pole tips 48 and 50, which, along with write pole tip 46, face recording surface 20 of storage disk 16 and form at least a portion of bearing surface 52 of slider 28.

Return pole 36 is located on the trailing side of write pole tip 46, and is separated from pole element 34 by a first spacer 54, and is connected to pole element 34 at a first back via 56. In the shown embodiment, writer 32 also includes front shield 58 disposed between write pole tip 46 and return pole tip 48 at bearing surface 52.

Return pole 38 is positioned on the opposing side of pole element 34 from return pole 36, on the leading side of write pole tip 46. In particular, return pole 38 is separated from pole element 34 by a second spacer 60, and is connected to pole element 34 at a second back via 62. In some embodiments, writer 32 may also include a leading shield (not shown) disposed between write pole tip 46 and return pole tip 50.

Return poles 36 and 38, write pole 40, and back vias 56 and 62 may each be fabricated from one or more magnetically permeable materials, such as soft magnetic materials. Examples of suitable soft magnetic materials include CoFe, NiFe, FeAlN, FeTaN, CoFeB, CoFeN, combinations thereof, and the like. Yoke 42 and bridge feature 44 may each be fabricated from one or more high magnetic moment materials, such as CoFe, CoNiFe, combinations thereof, and the like. As discussed below, the combination of a high-magnetic moment yoke 42 at a recessed location relative to bearing surface 52, and a thin high-magnetic moment bridge feature 44 extending between yoke 42 and write pole tip 46 increases the rate of magnetization reversal at the region of write pole 40 between yoke 42 and write pole tip 46.

Conductive coil 64 wraps around pole element 34 to extend between pole element 34 and return pole 36, and between pole element 34 and return pole 38. Conductive coil 64 may be fabricated from one or more electrically conductive materials, such as Cu, Ag, Au, and the like. Insulating materials (e.g., alumina) of spacers 54 and 60 may electrically insulate conductive coil 64 from pole element 34 and return poles 36 and 38. In alternative embodiments, conductive coil 64 may exhibit different arrangements. For example, conductive coil 64 may include two separate conductive coils, where the first coil may extend between pole element 34 and return pole 36 (around back via 56), and the second coil may extend between pole element 34 and return pole 38 (around back via 62).

Recordable surface 20 of storage disk 16 includes storage layer 66 and underlying layer 68. Storage layer 66 is a hard magnetic layer having perpendicular orientation of magnetization for storing data. Underlying layer 68 is a soft magnetic layer disposed below storage layer 66. During operation, a magnetic circuit may be formed in writer 32 by pole element 34, return poles 36 and 38, back vias 56 and 62, and underlying layer 68. In particular, an electrical current may be generated in conductive coil 64, which induces a magnetic flux that conducts through the magnetic circuit.

The magnetic circuit causes the magnetic flux to travel vertically through write pole tip 46 and storage layer 66 of recordable surface 20, as indicated by arrow 70. Next, the magnetic flux is directed horizontally through underlying layer 68 of recordable surface 20, as indicated by arrows 72 and 74. The magnetic flux is then directed vertically back through storage layer 66, through return pole tip 48 of return pole 36, and through return pole tip 50 of return pole 38, as indicated by arrows 76 and 78. Finally, the magnetic flux is conducted back to pole element 34 through back vias 56 and 62.

In one example, write pole tip 46 is shaped to concentrate the magnetic flux traveling therethrough to such an extent that the orientation of magnetization in patterns 80 of storage layer 66 are forced into alignment with the writing magnetic field and, thus, cause bits of data to be recorded therein. Accordingly, the magnetic field in storage layer 66 at write pole tip 46 is greater than the coercivity or saturation field of that layer, and more at least twice the coercivity or saturation field of that layer, for example. In the shown example, storage disk 16 rotates in the direction indicated by arrow 82. Accordingly, a trailing edge of write pole tip 46 operates as a "writing edge" that defines the transitions between bits of data recorded in storage layer 66, since the field generated at that edge is the last to define the magnetization orientation in each pattern 80.

As discussed above, bridge feature 44 extends along the surface of write pole 40 between yoke 42 and write pole tip 46, and exhibits dimensions that decrease in cross-sectional area from yoke 42 to write pole tip 46. In the embodiment shown in FIG. 2, bridge feature 44 includes sloped surface 82 that gradually decreases from a first end (at yoke 42) to a second end (at write pole tip 46). Bridge feature 44 also includes lateral surfaces 86a and 86b (lateral surface 86b not shown in FIG. 2), which, in the current embodiment extend perpendicular to sloped surface 84.

As shown in FIG. 3, bridge feature 44 is disposed on trailing surface 88 of write pole 40, and extends between base surface 90 of yoke 42 and write pole tip 46 along the vertical z-axis. Bridge feature 44 is laterally confined along the lateral y-axis between lateral surfaces 86a and 86b, and gradually decreases along the lateral x-axis to define sloped surface 84. Accordingly, as discussed above, bridge feature 44 exhibits dimensions that decrease in cross-sectional area from a first end at yoke 42 (referred to as recessed end 92) to a second end at write pole tip 46 (referred to as proximate end 94). The cross-sectional area is taken in a plane that is normal to an axis that extends from yoke 42 to write pole tip 46. In the shown embodiment, the axis that extends from yoke 42 to write pole tip 46 is the vertical z-axis, and the plane normal to the z-axis is an x-y plane.

In alternative embodiments, bridge feature 44 may exhibit non-gradually sloped surfaces in lieu of sloped surface 84. For example, bridge feature 44 may exhibit an incrementally decreasing surface (not shown) between recessed end 92 and proximate end 94, such that the surface exhibits a stair-stepping effect. A variety of other geometries may alternatively be used such that the cross-sectional area of bridge feature 44 decreases from recessed end 92 to proximate end 94.

As discussed below, the decrease in cross-sectional area of bridge feature 44 between the recessed yoke 42 and write pole tip 46 and bearing surface 52 (shown in FIG. 2), along with the high-magnetic moment material of bridge feature 44, increases the rate of magnetic reversal along the region of write pole 40 between yoke 42 and write pole tip 46. This is accomplished while retaining yoke 42 at a recessed location from bearing surface 52, thereby reducing the interaction between yoke 42 and front shield 58 (shown in FIG. 2).

FIGS. 4 and 5 illustrate suitable dimensions for bridge feature 44. As shown in FIG. 4, proximate end 94 of bridge feature 44 is offset from bearing surface 52 along the z-axis by offset distance 96. Examples of suitable lengths for offset distance 96 range from about 50 nanometers to about 200 nanometers, with particularly suitable lengths ranging from about 75 nanometers to about 150 nanometers.

Recessed end 92 of bridge feature 44 contacts base surface 90 of yoke 42, thereby providing a continuous contact of high-magnetic moment material(s). In one embodiment, bridge feature 44 may be fabricated as an integral component of yoke 42, such that recessed end 92 is integrally connected to base surface 90. Base surface 90 is recessed from bearing surface 52 by a recessed distance along the z-axis (referred to as recessed distance 98) that is sufficient to reduce the interaction between yoke 42 and front shield 58 (shown in FIG. 2). Examples of suitable lengths for recessed distance 98 range from about 1.0 micrometer to about 3.0 micrometers, with particularly suitable lengths ranging from about 1.5 micrometers to about 2.5 micrometers.

Suitable lengths for bridge feature 44 between base surface 90 of yoke 42 and write pole tip 46 (referred to as length 99) include the differences between recessed distance 98 and offset distance 96. Accordingly, examples of suitable distances for length 99 range from about 0.8 micrometers to about 2.9 micrometers, with particularly suitable distances ranging from about 1.4 micrometers to about 2.4 micrometers.

In the shown embodiment, yoke 42 and recessed end 92 of bridge feature 44 have substantially the same thickness along the x-axis (referred to as thickness 100). In alternative embodiments, recessed end 92 of bridge feature 44 may exhibit different thicknesses compared to yoke 42 along the x-axis. Examples of suitable thicknesses for yoke 42, and examples of suitable maximum thicknesses for recessed end 92 of bridge feature 44, along the x-axis (e.g., thickness 100) each range from about 200 nanometers to about 600 nanometers with particularly suitable thicknesses ranging from about 300 nanometers to about 500 nanometers.

As shown in FIG. 5, bridge feature 44 has a width in the lateral y-axis (referred to as width 102), where width 102 is substantially constant between recessed end 92 and proximate end 94. As discussed below, in alternative embodiments, the bridge feature may have a width that varies between the recessed end and the proximate end. Examples of suitable dimensions for width 102 range from about 100 nanometers to about 400 nanometers, with particularly suitable dimensions ranging from about 200 nanometers to about 300 nanometers. For perspective, suitable widths for write pole 40 and yoke 42 at base surface 90 (referred to as width 104) range from about 2.0 micrometers to about 3.0 micrometers.

Figure 6A:
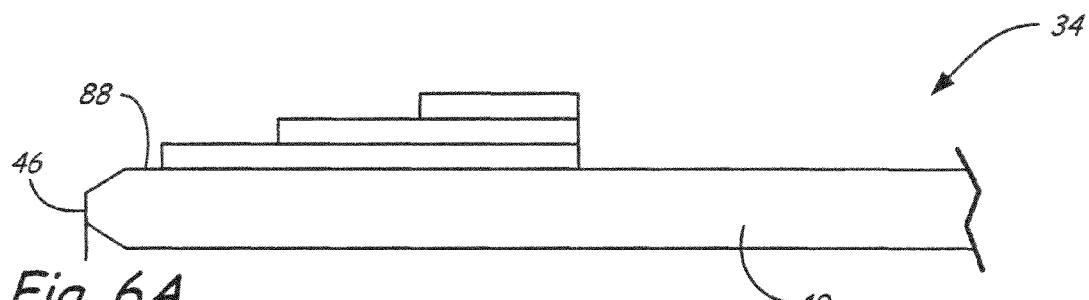
FIGS. 6A-6D are side schematic illustrations of the pole element of the writer, illustrating a process for fabricating the pole element according to an embodiment.

FIGS. 6A-6D illustrate an example process for fabricating pole element 34. As shown in FIG. 6A, write pole 40 may be formed on underlying spacer 60, back via 62, coil 64, return pole 38, and read element (not shown) in a conventional manner. Layers 106a-106c may then be plated on write pole 40 using one or more high magnetic moment materials to achieve the shown stepped structure, where lateral expansion may be controlled by photolithography masks. While illustrated with three layers (i.e., layers 106a-106c), alternative numbers of layers may be plated on write pole 40 to attain desired dimensions for bridge feature 44.

Figure 6B:
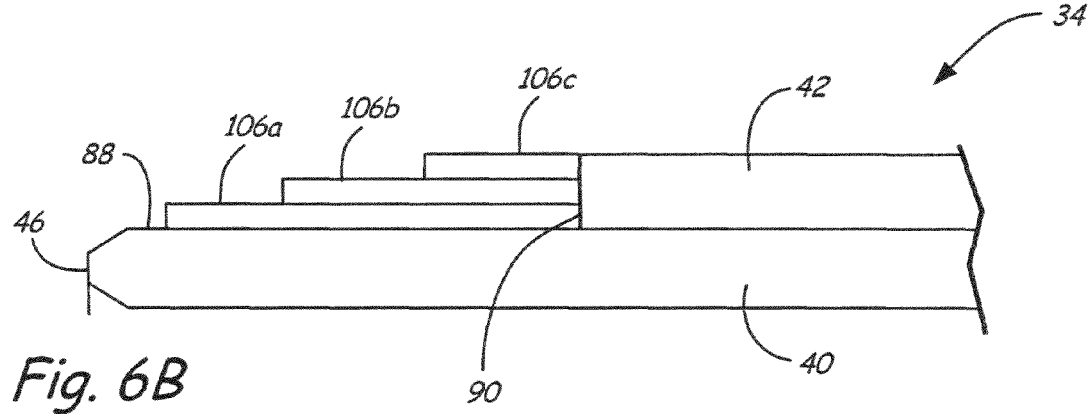

As shown in FIG. 6B, one or more materials may also be plated and planarized to form yoke 42 adjacent to layers 106a-106c. In an alternative embodiment in which yoke 42 and bridge feature 44 are integrally formed together, layers 106a-106c may also extend across the region for yoke 42.

Figure 6C:
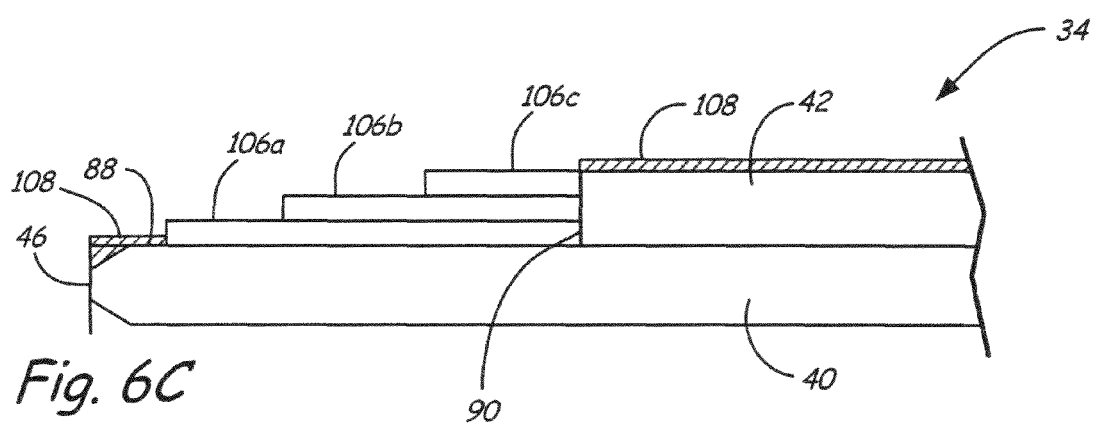
Figure 6D:
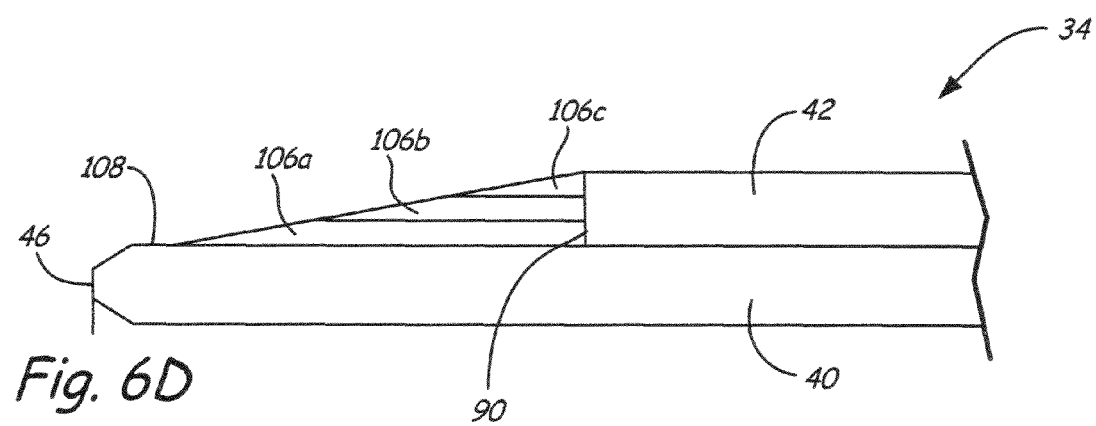

As shown in FIG. 6C, one or more patterned hardmasks 108 may then be formed over surface 88 of write pole 40 adjacent to write pole tip 46, and over yoke 42. As shown in FIG. 6D, layers 106a-106c may then be milled to achieve the sloped geometry of bridge feature 44. Hardmasks 108 may also be removed. Subsequent layers for writer 32 may then be fabricated to form spacer 54, back via 56, front shield 58, coil 64, and return pole 36 in a conventional manner.

Figure 7:
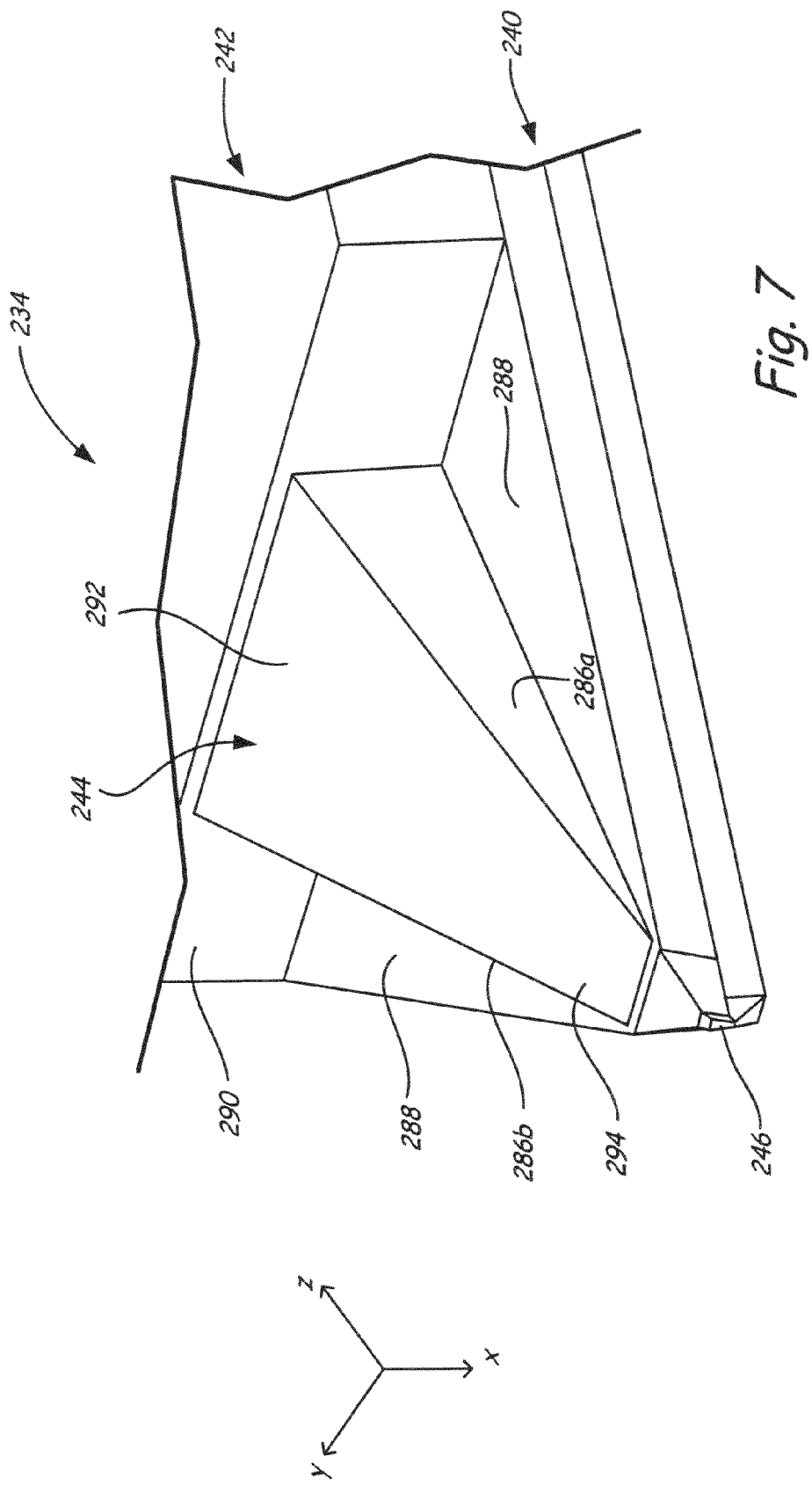
FIG. 7 is a perspective view of an pole element of a first alternative writer, where the pole element includes a laterally-flared bridge feature according to an embodiment.

FIG. 7-9 illustrate an alternative to pole element 234 and bridge feature 44 (shown in FIGS. 2-6D), where corresponding reference labels are increased by "200". As shown in FIG. 7, bridge feature 244 of pole element 234 is a laterally-flared bridge feature having dimensions that decrease in thickness along the lateral y-axis (in addition to having dimensions that decrease along the x-axis). As such, lateral surfaces 286a and 286b are also sloped surfaces, thereby allowing recessed end 292 of bridge feature 244 to exhibit a larger cross-sectional area compared to recessed end 92 of bridge feature 44 (shown in FIGS. 3-5). This arrangement may further increase magnetization reversal processes.

As shown in FIG. 8, bridge feature 244 has dimensions in the x-z plane defined by offset distance 296, recessed distance 298, and thickness 300. Examples of suitable dimensions for offset distance 296, recessed distance 298, length 299, and thickness 300 include those discussed above for bridge feature 244 (i.e., offset distance 96, recessed distance 98, length 99, and thickness 100, shown in FIG. 4).

As shown in FIG. 9, bridge feature 244 exhibits a flared geometry, where the width between lateral surfaces 286a and 286b decreases from recessed end 292 to proximate end 290. The width between lateral surfaces 286a and 286b at proximate end 294 (referred to as width 302p) may exhibit similar dimensions to width 102 of bridge feature 44 (shown in FIG. 5), thereby reducing the interaction between yoke 242 and a corresponding front shield. Examples of suitable dimensions for width 302p range from about 100 nanometers to about 400 nanometers, with particularly suitable dimensions ranging from about 200 nanometers to about 300 nanometers. For perspective, suitable widths for write pole 240 and yoke 242 at base surface 290 (referred to as width 304) range from about 2.0 micrometers to about 3.0 micrometers.

In comparison, the width between lateral surfaces 286a and 286b at recessed end 292 (referred to as width 302r) exhibits dimensions that are greater than width 302p at proximate end 294. Examples of suitable dimensions for width 302r range from about 500 nanometers to about 1,500 nanometers, with particularly suitable dimensions ranging from about 800 nanometers to about 1,200 nanometers. As discussed above, the laterally-flared geometry of bridge assembly 244 may allow a greater volume of high-magnetic moment material(s) to be located along the region of write pole 240 between toke 242 and write pole tip 246, while also reducing the amount of high-magnetic moment material(s) located closer to write pole tip 246.

Accordingly, bridge feature 244 also has a cross-sectional area that decreases between the recessed yoke 242 and write pole tip 246 and bearing surface 252. This decrease in cross-sectional area, along with the high-magnetic moment material of bridge feature 244, may increase the rate of magnetic reversal along the region of write pole 240 between yoke 242 and write pole tip 246. The laterally-flared geometry may further increase magnetic reversal rates compared to those attainable with bridge feature 44. This is also accomplished while retaining yoke 242 at a recessed location from bearing surface 252, thereby reducing the interaction between yoke 242 and front shield 258 (not shown).

Figure 10:
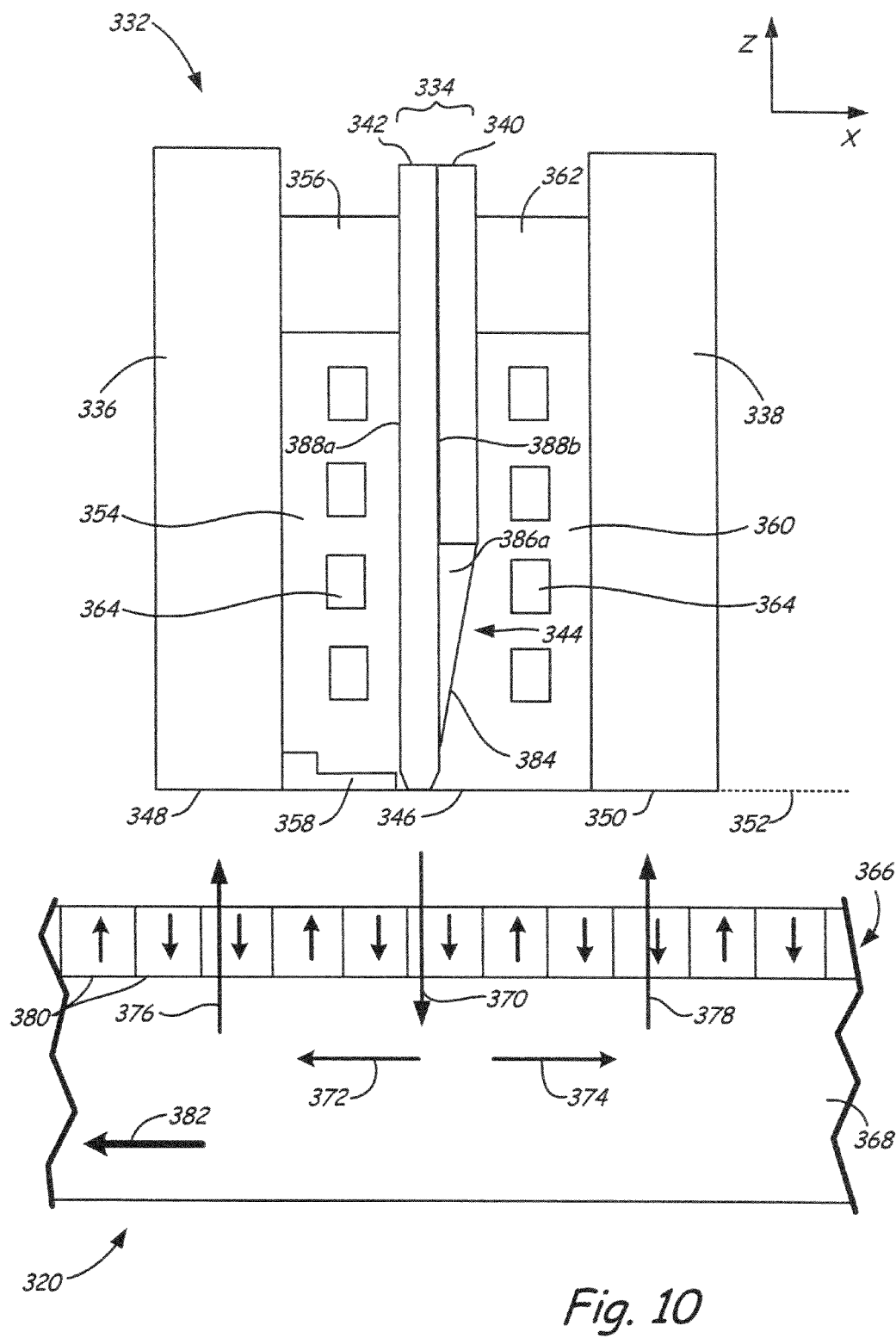
FIG. 10 is a side schematic illustration of a second alternative writer and a magnetic disk, taken along a plane normal to a bearing surface, where the second alternative writer includes pole element having a leading-edge bridge feature according to an embodiment.

FIG. 10 illustrates an additional alternative embodiment to pole element 34 (shown in FIG. 2-6D) and pole element 234 (shown in FIGS. 7-9), where the corresponding reference labels are increased by "300" to those shown in FIG. 2. As shown in FIG. 10, pole element 334 of writer 332 includes write pole 340 having trailing surface 388a (corresponding to surfaces 88 and 288) and leading surface 388b, which is the opposing surface from trailing surface 388a. In this embodiment, yoke 342 and bridge feature 344 are located on leading surface 388b of write pole 340, and may exhibit dimensions corresponding to yokes 42 and 242 and bridge features 44 and 244. Accordingly, pole element 334 may be operated in a similar manner to write pole assemblies 34 and 234.

Figure 11A:
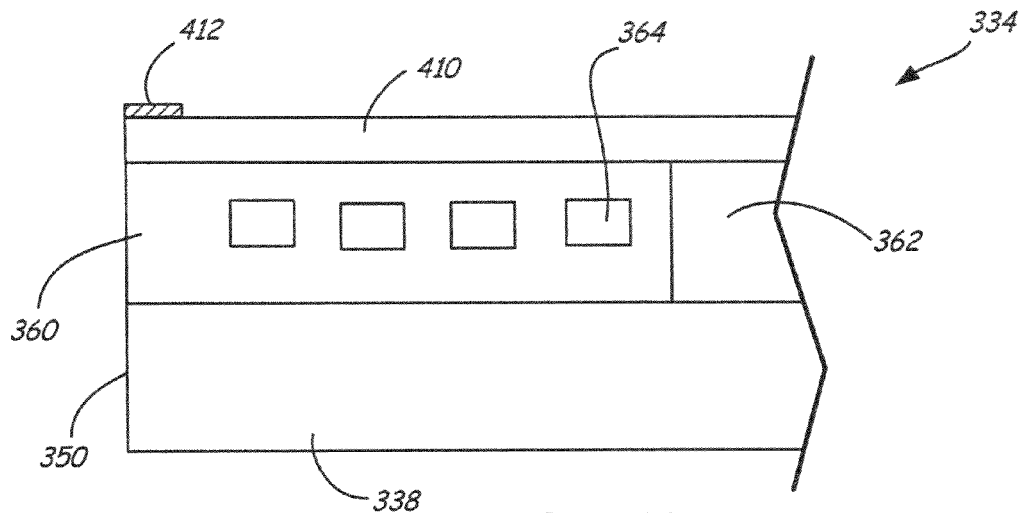
FIGS. 11A-11E are side schematic illustrations of the pole element of the second alternative writer, illustrating a process for fabricating the pole element according to an embodiment.

FIGS. 11A-11E illustrate an example process for fabricating pole element 334. As shown in FIG. 11A, return pole 338, a portion of spacer 360, back via 362, and coil 354 may be formed in a conventional manner. An additional layer 410 of insulating material (e.g., alumina) may then be plated on the portion of spacer 360 and back via 362, and hardmask 412 may be patterned over the tip portion of layer 410.

Figure 11B:
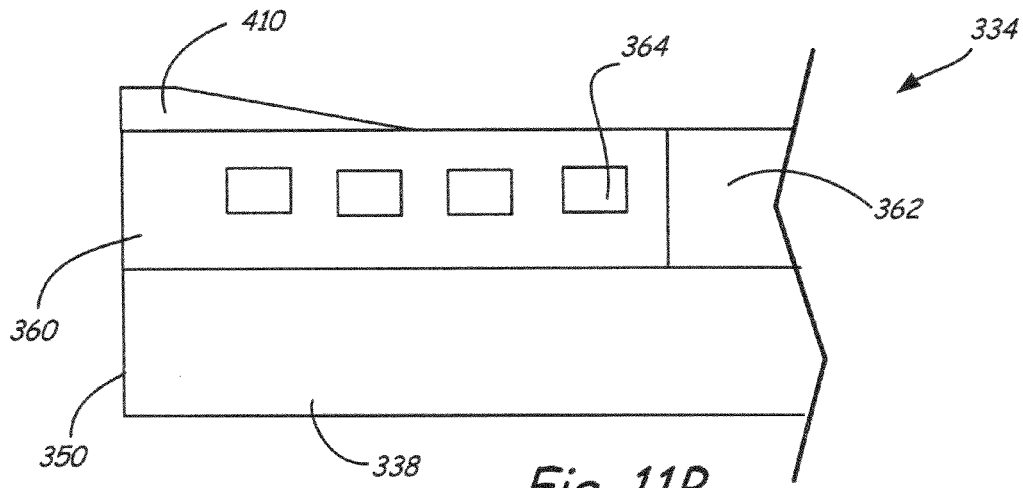
Figure 11C:
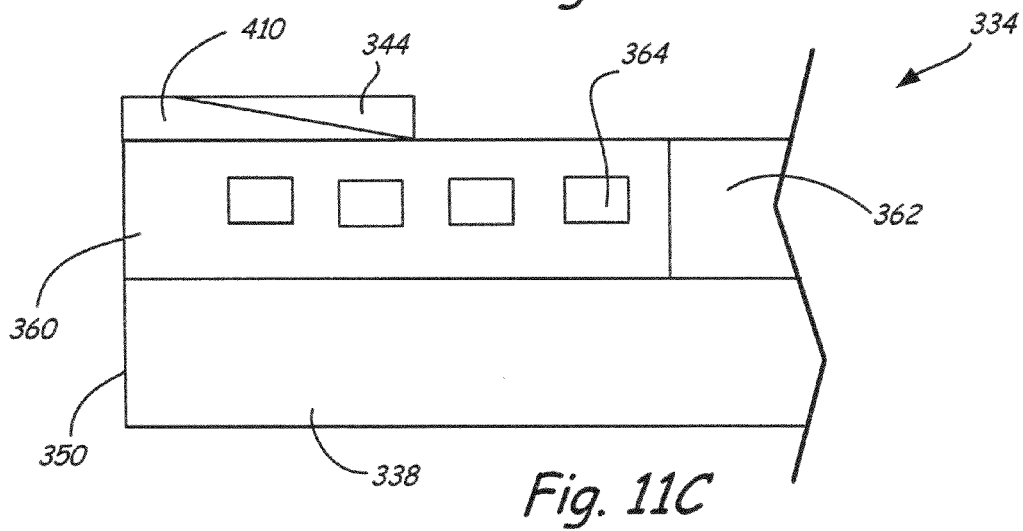

As shown in FIG. 11B, layer 410 may then be milled to achieve a sloped geometry that will be the mirror image of bridge feature 344. Hardmask 412 may also be removed. As shown in FIG. 11C, one or more high-magnetic moment materials may then be plated on layer 410, where lateral expansion may be controlled by photolithography masks. This forms bridge feature 344.

Figure 11D:
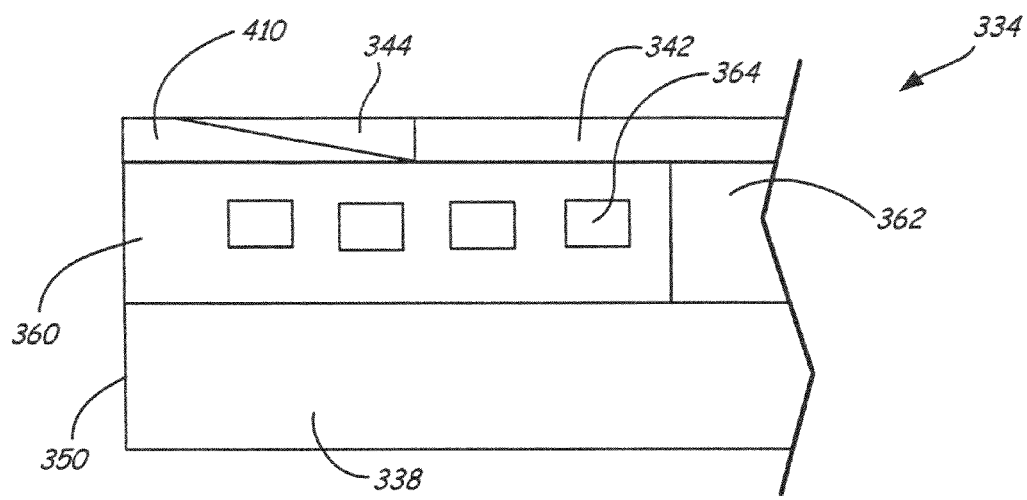

As shown in FIG. 11D, one or more high-magnetic moment materials may be deposited on spacer 360 and back via 362 to form yoke 342. In an alternative embodiment in which yoke 342 and bridge feature 344 are integrally formed together, the plated material of bridge feature 344 may also extend across the region for yoke 342.

Figure 11E:
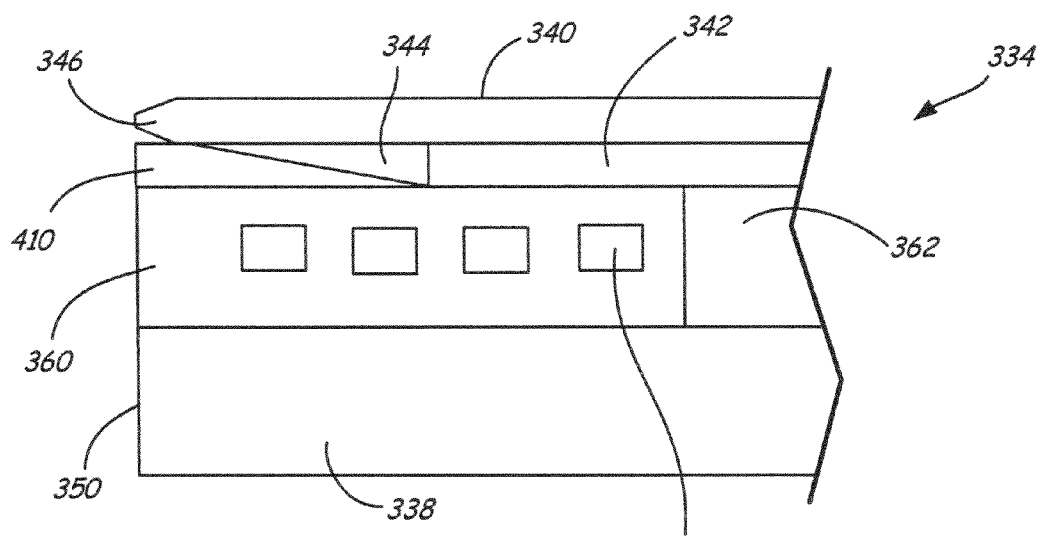

Correspondingly, as shown in FIG. 11E, suitable materials may then be plated in a conventional manner on yoke 342, bridge feature 344, and layer 410 to form write pole 340. The remaining components of writer 332 (e.g., spacer 354, back via 356, front shield 258, the remaining portion of coil 364, and return pole 336, not shown in FIG. 11E) may then be formed on write pole 340 in a conventional manner. In comparison to the process shown in FIGS. 6A-6D, which forms a bridge feature on a trailing surface of the write pole, the process shown in FIGS. 11A-11E forms a bridge feature (e.g., bridge feature 344) on a leading surface of the write pole.

Figure 12:
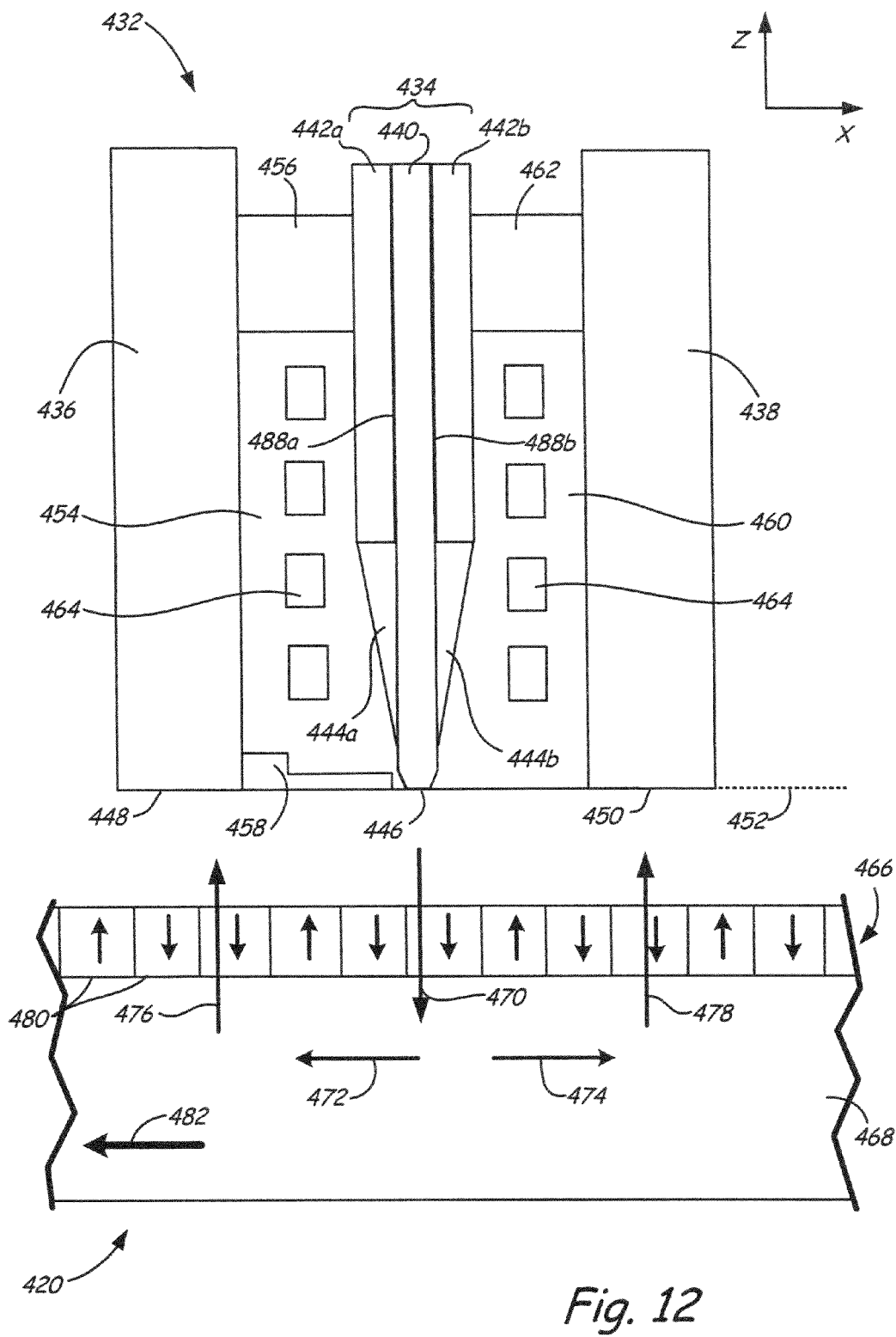
FIG. 12 is a side schematic illustration of a third alternative writer and a magnetic disk, taken along a plane normal to a bearing surface, where the third alternative writer includes a pole element having opposing bridge features according to an embodiment.

FIG. 12 illustrates an additional alternative embodiment to pole element 34 (shown in FIG. 2-6D), pole element 234 (shown in FIGS. 7-9), and pole element 334 (shown in FIGS. 10-11D), where the corresponding reference labels are increased by "400" to those shown in FIG. 2. As shown in FIG. 12, pole element 434 of writer 432 includes a pair of yokes 442a and 442b, and a pair of bridge features 444a and 444b, which are located on opposing surfaces of 488a and 488b of write pole 440. In this embodiment, yoke 442a and bridge feature 444a are disposed on trailing surface 488a, and may exhibit dimensions corresponding to yokes 42 and 242 and bridge features 44 and 244. Similarly, yoke 442b and bridge feature 444b are disposed on trailing surface 488b, and may also exhibit dimensions corresponding to yokes 42 and 242 and bridge features 44 and 244.

Pole element 434 may be fabricated and operated in a similar manner to write pole assemblies 34, 234, and 334. In particular, yoke 422b, bridge feature 444b, and write pole 440 may be fabricated using the process shown in FIGS. 11A-11E, and yoke 442a and bridge feature 444a may subsequently be fabricated on write pole 440 using the process shown in FIGS. 11A-11E.

The above-discussed embodiments illustrate that the bridge feature of the present disclosure may exhibit a variety of different geometries such that the cross-sectional area of a given bridge feature decreases from a recessed end adjacent to the yoke to a proximate end adjacent to the write pole tip. As discussed above, the inclusion of a bridge feature between the yoke and the write pole tip in an embodiment allows the yoke to remain recessed from the write pole tip, while also increasing the rate of magnetization reversal in the region of the write pole between the yoke and the write pole tip. This increase in the rate of magnetization reversal may accordingly allow high magnetic gradients and high write fields to be achieved, reduce the risk of shield erasures, and provide good writer magnetic switching. These properties may correspondingly allow the device to attain BPI densities and high data transfer rates.

EXAMPLES

The present disclosure is more particularly described in the following examples that are intended as illustrations only, since numerous modifications and variations within the scope of the present disclosure will be apparent to those skilled in the art. Perpendicular writers of Example 1 and Comparative Example A were quantitatively compared to illustrate the increased rate of magnetic reversal that is achieved with a bridge feature of the present disclosure.

The writer of Example 1 included a pole element corresponding to pole element 34, having a write pole, a CoNiFe yoke, and a CoFe bridge feature (shown in FIGS. 2-5). The bridge feature (corresponding to bridge feature 44) was offset from the bearing surface by about 100 nanometers (offset distance 96), and extended to a yoke that was recessed from the bearing surface by about 2 micrometers (recessed distance 98). The yoke and the bridge feature each had a thickness from the trailing surface of the write pole of about 400 nanometers (thickness 100). The bridge feature had a lateral width of about 250 nanometers (width 102), and the yoke and write pole at the base surface of the yoke each had a width of about 2.3 micrometers (width 104). The writer of Comparative Example A included a pole element without a bridge feature, but was otherwise identical to the writer of Example 1.

Figure 13:
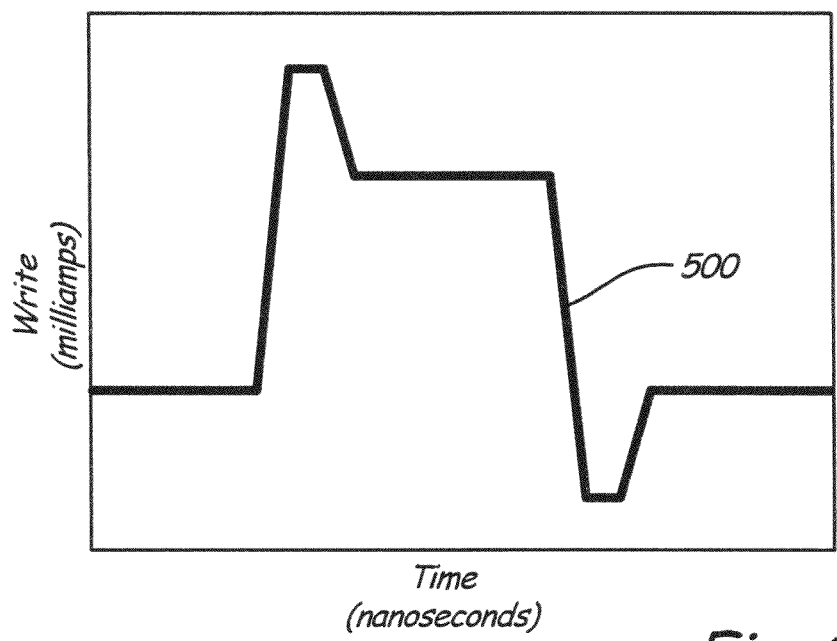
FIG. 13 is a graphical illustration of a write current waveform as a function of time according.

FIG. 13 shows write current waveform 500 as a function of time, where waveform 500 was a typical waveform applied to writer coils for the writers of Example 1 and Comparative Example A. The current amplitude switched between about +/−40 milliamps, with an overshoot pulse of about +/−80 milliamps. The time scale was of the order of nanoseconds with rise times of the order of about 100 picoseconds. These short and fast pulses are when writing high areal densities for high data rate products.

Figure 14A:
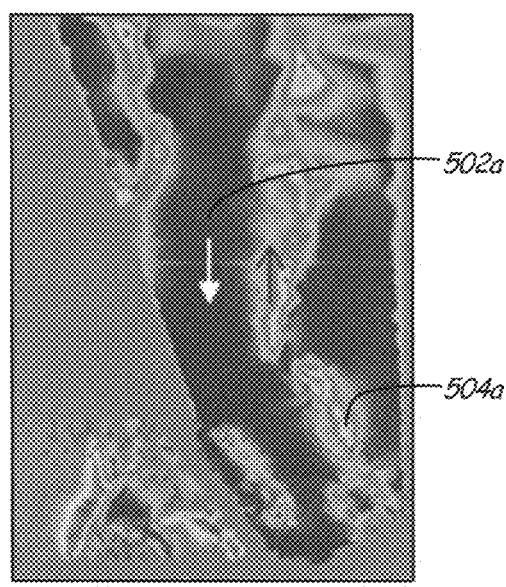
FIG. 14A is a graphical illustration of a writer cross section showing a micromagnetic simulation of switching dynamics for an example perpendicular writer according to an embodiment of the present disclosure.
Figure 14B:
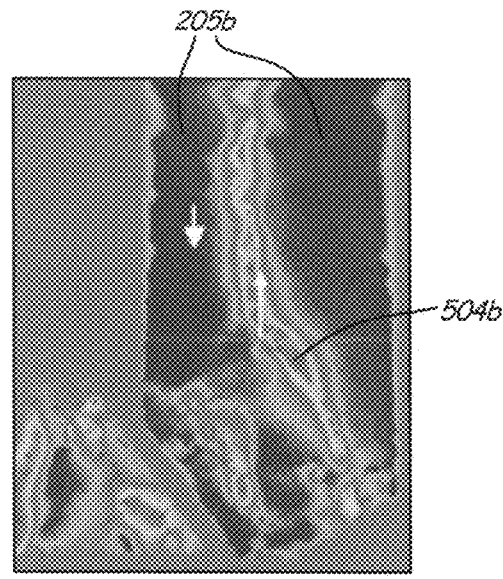
FIG. 14B is a graphical illustration of a writer cross section showing a micromagnetic simulation of switching dynamics for a comparative perpendicular writer.

FIGS. 14A and 14B are graphical illustrations of writer cross sections for writers of Example 1 and Comparative Example A, showing their respective switching dynamics by magnetic simulation. The magnetic simulations were sampled 250 picoseconds after the current was reversed, as illustrated above by current waveform 500 (shown in FIG. 13). The magnetization switched from the initial position +1 to the reversal position −1, where the regions that switched to the reversal position −1 at the sample point are indicated as blue or dark regions 502a for Example 1 in FIG. 14A and as blue or dark regions 502b for Comparative Example A in FIG. 14B.

The regions that remained in the initial position +1 at the sample point are indicated as red regions 504a for Example 1 in FIG. 14A, as red region 504b for Comparative Example A in FIG. 14B. A comparison of the results in FIGS. 14A and 14B show that the writer of Example 1 retained a smaller initial position +1 at the sample point compared to the writer of Comparative Example A (i.e., the intensity of region 504a is lower that of than region 504b). This illustrates the increased dynamic behavior of the writer of Example 1, relative to the conventional writer of Comparative Example A. Accordingly, the bridge feature reduces the time lag between when the write current is switched and when the writer magnetic field actually reverses.

Figure 15A:
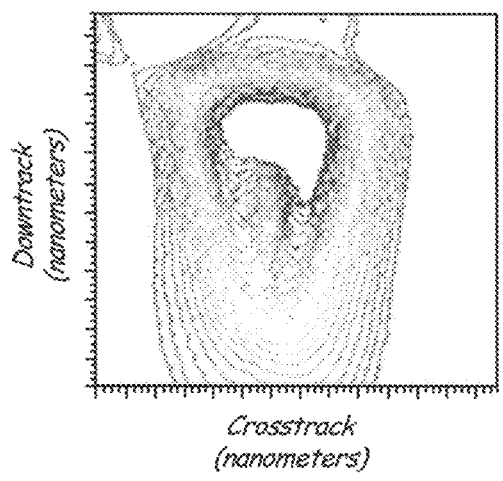
FIG. 15A is a graphical illustration of effective switching field patterns at the media level after switching for an example perpendicular writer according to an embodiment of the present disclosure.
Figure 15B:
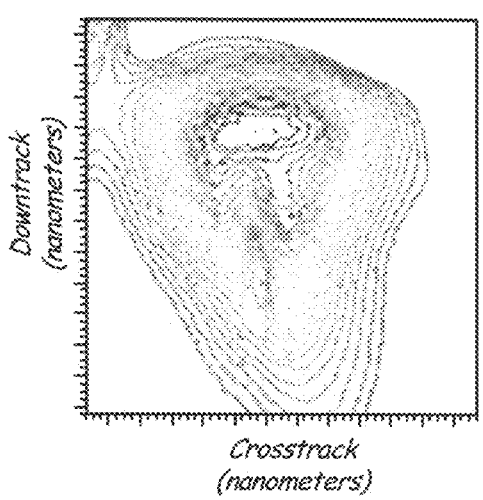
FIG. 15B is a graphical illustration of effective switching field patterns at the media level after switching for a comparative perpendicular writer.

FIGS. 15A and 15B are graphical illustrations of effective switching (Stonner-Wohlfarth) field patterns at the media level after switching respectively for the writer of the Example 1 (FIG. 15A) and for the writer of Comparative Example A (FIG. 15B). The field patterns were sampled 250 picoseconds after the current was reversed. A comparison of the results in FIGS. 15A and 15B may show that the writer of the Example 1 also displayed higher field amplitudes and a more stable pattern in a shorter time compared to the writer of Comparative Example A. This is also to be used to the incorporation of the bridge feature in the writer of Example 1.

Figure 16:
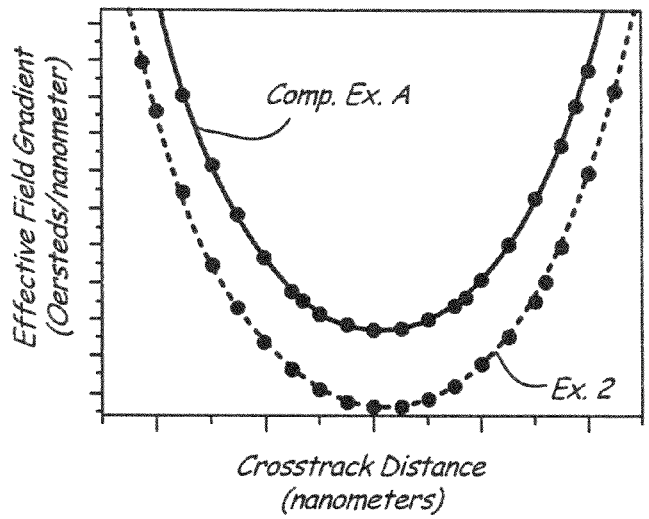
FIG. 16 is a graphical illustration of effective field gradients for an example perpendicular writer according to an embodiment of the present disclosure and for a comparative perpendicular writer.

FIG. 16 is a graphical illustration of effective field gradients for the writers of the Example 1 and Comparative Example A, where a lower value in FIG. 16 represented a better field gradient. The write field gradient may define the quality of the magnetic transition written, and a good field gradient may be for writing high bit per inch density. As shown in FIG. 16, the writer of the Example 1 exhibited a lower value (by more than a 20 oersteds/nanometer) relative to the writer of Comparative Example A. This metric illustrates that the writer of the Example 1 is capable of sharp magnetic transitions written to the media.

Figure 17:
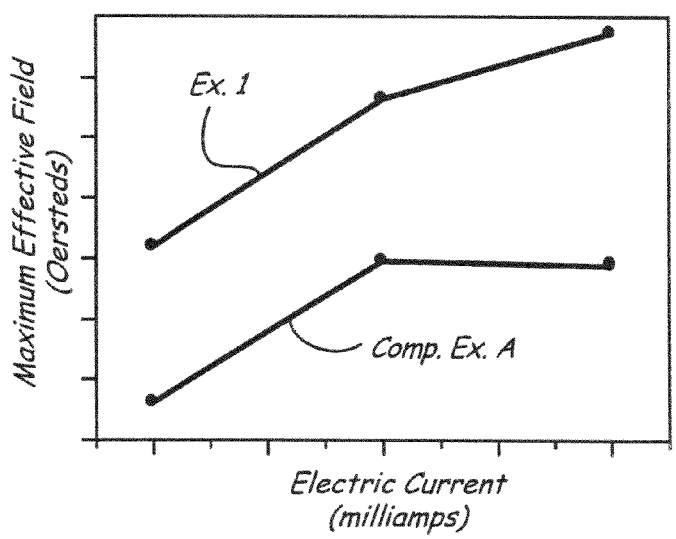
FIG. 17 is a graphical illustration of maximum effective fields generated by an example perpendicular writer according to an embodiment of the present disclosure and by a comparative perpendicular writer.

FIG. 17 is a graphical illustration of the maximum effective fields generated by the writers of the Example 1 and Comparative Example A. As shown, the writer of the Example 1 attained a higher effective field compared to the writer of Comparative Example A. A high effective field may be for writing to media at high areal densities. Higher areal densities provide smaller media grains to maintain signal to noise ratio. As the grains get smaller, the anisotropy may increase in order to maintain thermal stability. Accordingly, high writer magnetic fields allow a writer to overcome higher magnetic media coercivities.

Figure 18:
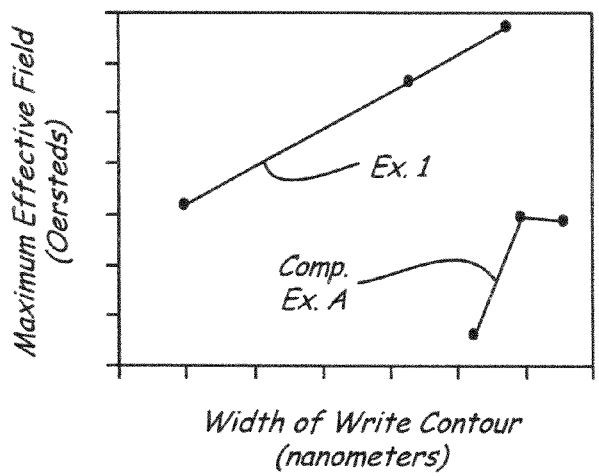
FIG. 18 is a graphical illustration of width of write contours as a function of the maximum effective field for an example perpendicular writer according to an embodiment of the present disclosure and for a comparative perpendicular writer.

FIG. 18 is a graphical illustration of width of write contours as a function of the maximum effective field for the writers of Example 1 and Comparative Example A. The results shown in FIG. 18 illustrate that the writer of Example 1 was capable of attaining narrower write width contours at high maximum effective fields compared to those attainable by the writer of Comparative Example A. Attaining a narrow write width contour at a high maximum effective field translates to higher track density. As such, the writer of Example 1 is capable of writing narrower tracks with higher magnetic fields compared to the writer of Comparative Example A.

The above-discussed examples further illustrate the incorporating a bridge feature of the present disclosure that has a cross-sectional area that decreases from a recessed end adjacent to the yoke to a proximate end adjacent to the write pole tip. The results show that the writers of the present disclosure may be capable of providing high magnetic gradients and high write fields, reduced shield erasures, and good writer magnetic switching. As discussed above, these properties correspondingly may allow the device to attain BPI densities and high data transfer rates. However, transducing head writers of the present disclosure are not intended to be limited, and various embodiments of the present disclosure may provide a variety of different functional properties.

Although the present disclosure has been described with reference to preferred embodiments, workers skilled in the art will recognize that changes may be made in form and detail without departing from the spirit and scope of the disclosure.

The invention claimed is:

1. A device comprising:
a medium; and
a transducing head writer comprising:
 a write pole having a trailing surface and a write pole tip;
 a yoke disposed on the trailing surface of the write pole, with respect to a direction of motion of the medium, at a location that is recessed from the write pole tip; and
 a bridge feature disposed on the trailing surface of the write pole between the yoke and the write pole tip, wherein the bridge feature has a geometry that is larger at a recessed end adjacent to the yoke compared to a proximate end adjacent to the write pole tip.

2. The transducing head writer of claim 1, wherein the bridge feature has a sloped surface that has a first thickness from the trailing surface of the write pole at the recessed end and that has a second thickness from the trailing surface of the write pole at the proximate end, the first thickness being greater than the second thickness.

3. The transducing head writer of claim 2, wherein the first thickness ranges from about 200 nanometers to about 600 nanometers.

4. The transducing head writer of claim 1, wherein the bridge feature has a substantially constant width ranging from about 100 nanometers to about 400 nanometers.

5. The transducing head writer of claim 1, wherein the bridge feature has a laterally-flared geometry comprising a first width at the recessed end and a second width at the proximate end, the first width being greater than the second width.

6. The transducing head writer of claim 1, wherein the bridge feature has a length between the recessed end and the proximate end ranging from about 0.8 micrometers to about 2.9 micrometers.

7. The transducing head writer of claim 6, wherein the length of the bridge feature ranges from about 1.4 micrometers to about 2.4 micrometers.

8. The transducing head writer of claim 1, wherein the bridge feature compositionally comprises CoFe, CoNiFe, and combinations thereof.

9. A device comprising:
a medium; and
a transducing head writer comprising:
 a write pole having a trailing surface and a write pole tip;
 a yoke disposed on the trailing surface of the write pole, with respect to a direction of motion of the medium, at a location that is recessed along an axis from the write pole tip; and
 a bridge feature disposed on the trailing surface of the write pole, wherein the bridge feature comprises:
  a recessed end that is adjacent to the yoke;
  a proximate end that is adjacent to the write pole tip;
  a first cross-sectional area orthogonal to the axis at the recessed end; and
  a second cross-sectional area orthogonal to the axis at the proximate end, wherein the first cross-sectional area is greater than the second cross-sectional area.

10. The transducing head writer of claim 9, wherein the axis is a first axis, and wherein the bridge feature comprises:
 a first thickness from the trailing surface of the write pole along a second axis at the recessed end, the second axis being orthogonal to the first axis and to the surface of the write pole; and
 a second thickness from the trailing surface of the write pole along the second axis at the proximate end, wherein the first thickness is greater than the second thickness.

11. The transducing head writer of claim 10, wherein the first thickness ranges from about 200 nanometers to about 600 nanometers.

12. The transducing head writer of claim 9, wherein the bridge feature has a substantially constant width along a third axis, the third axis being orthogonal to the first axis and to the second axis.

13. The transducing head writer of claim 9, wherein the bridge feature has a first width along a third axis at the recessed end and a second width along the third axis at the proximate end, wherein the third axis is orthogonal to the first axis and to the second axis, and wherein the first width is greater than the second width.

14. The transducing head writer of claim 9, wherein the bridge feature is a first bridge feature, the yoke is a first yoke, and wherein the write pole further comprises a leading surface that opposes the trailing surface, and wherein the write pole assembly further comprises:
 a second yoke disposed on the leading surface of the write pole at a location that is recessed along the axis from the write pole tip; and
 a second bridge feature disposed on the leading surface of the write pole and extending along the axis between the second yoke and the write pole tip.

15. A device comprising:
a medium; and
a transducing head writer comprising:
 a write pole having a trailing surface and a write pole tip;
 a yoke disposed on the trailing surface of the write pole, with respect to a direction of motion of the medium, at a location that is recessed from the write pole tip; and
 a bridge feature disposed on the trailing surface of the write pole between the yoke and the write pole tip, wherein the bridge feature has a cross-sectional area that decreases from a recessed end adjacent to the yoke toward a proximate end adjacent to the write pole tip.

16. The device of claim 15, wherein the bridge feature has a sloped surface that has a first thickness from the trailing surface of the write pole at the recessed end and that has a second thickness from the trailing surface of the write pole at the proximate end, the first thickness being greater than the second thickness.

17. The device of claim 16, wherein the first thickness ranges from about 200 nanometers to about 600 nanometers.

18. The device of claim 15, wherein the bridge feature has a substantially constant width ranging from about 100 nanometers to about 400 nanometers.

19. The device of claim 15, wherein the bridge feature has a laterally-flared geometry comprising a first width at the recessed end and a second width at the proximate end, the first width being greater than the second width.

20. The device of claim 15, wherein the bridge feature has a length between the recessed end and the proximate end ranging from about 0.8 micrometers to about 2.9 micrometers.

* * * * *